US008875550B1

(12) United States Patent
Spunt et al.

(10) Patent No.: US 8,875,550 B1
(45) Date of Patent: Nov. 4, 2014

(54) DOUBLE SHACKLE BICYCLE PADLOCK WITH RFID UNLOCKING

(71) Applicants: Bryan Daniel Spunt, Malibu, CA (US); Steven Goldstein, Los Angeles, CA (US)

(72) Inventors: Bryan Daniel Spunt, Malibu, CA (US); Steven Goldstein, Los Angeles, CA (US)

( * ) Notice: Subject to any disclaimer, the term of this patent is extended or adjusted under 35 U.S.C. 154(b) by 0 days.

(21) Appl. No.: 13/672,676

(22) Filed: Nov. 8, 2012

Related U.S. Application Data

(60) Provisional application No. 61/557,216, filed on Nov. 8, 2011.

(51) Int. Cl.

| | |
|---|---|
| ***E05B 49/00*** | (2006.01) |
| ***B62H 5/00*** | (2006.01) |
| ***E05B 67/22*** | (2006.01) |
| ***E05B 71/00*** | (2006.01) |
| ***G07C 9/00*** | (2006.01) |

(52) U.S. Cl.
CPC ............ *G07C 9/00896* (2013.01); *E05B 71/00* (2013.01)
USPC .................. 70/233; 70/38 A; 70/53; 70/278.7

(58) Field of Classification Search
USPC ......... 70/38 A, 38 C, 51, 53, 233, 277, 278.1, 70/278.7, 279.1
See application file for complete search history.

(56) References Cited

U.S. PATENT DOCUMENTS

| | | | | |
|---|---|---|---|---|
| 2,508,302 | A * | 5/1950 | Stue | 70/39 |
| 5,505,064 | A * | 4/1996 | Wang | 70/39 |
| D454,293 | S | 3/2002 | Bremicker | |
| D474,100 | S | 5/2003 | Zapushek | |
| 7,121,124 | B1 * | 10/2006 | Whinery | 70/38 C |
| 7,236,085 | B1 * | 6/2007 | Aronson et al. | 70/278.1 |
| 7,631,524 | B2 * | 12/2009 | Araujo | 70/30 |
| 7,698,917 | B2 | 4/2010 | Nielsen | |
| 7,948,359 | B2 * | 5/2011 | Marcelle et al. | 70/38 A |
| 2009/0301145 | A1 * | 12/2009 | Valerio et al. | 70/21 |
| 2012/0318028 | A1 * | 12/2012 | Hahn | 70/41 |

FOREIGN PATENT DOCUMENTS

CH 702476 A 12/2009

OTHER PUBLICATIONS

RFID Padlock and Doorlock Advertised by Another on Web/Internet http://images.search.yahoo.com/search/images?_adv_prop=image&fr=ush1-finance&va=rfid+padlock.

* cited by examiner

*Primary Examiner* — Christopher Boswell
(74) *Attorney, Agent, or Firm* — Robert W. J. Usher

(57) ABSTRACT

A bicycle padlock has two, independently manipulated, shackles of unequal size, long and short, extending from opposite sides of a body which houses an RFID reader for remote, automatic unlocking. Circuitry in the housing includes a microprocessor which actuates the reader to operate an unlocking motor only within a limited time of receiving a signal from a motion sensor, for battery conservation. A secondary manual unlocking mechanism is operable on failure of the automatic unlocking circuitry.

9 Claims, 7 Drawing Sheets

DOUBLE SHACKLE BICYCLE PADLOCK WITH RFID UNLOCKING

RELATED APPLICATION

Priority is claimed from our provisional application No. 61/557,216 filed Nov. 8, 2011, the disclosure of which is incorporated herein by reference.

FIELD OF THE INVENTION

The invention relates to a double shackle bicycle lock with an RFID release mechanism

BACKGROUND OF THE INVENTION

Bike theft is a serious problem faced by many people, with one major target being college students. On college campuses, most students have very demanding schedules and very little time to spare. The two main bike locks on the market utilize either a flexible cable or chain that uses either a padlock or incorporates a built in locking mechanism to attach the two ends together, or more popularly and more secure, is a solid bar lock shaped like a U or D with the locking device closing the open ends of the curved bar, and thus securing the bike. Both of the current styles of locks use either a combination code or key to unlock the lock.

Although, in most cases these locks may deter theft they leave the owner inconvenienced and wasting time everyday. Both of these locks have their problems. A combination lock is great until the sun goes down. Because the numbers on the combination are not illuminated the lock becomes hard to operate. An external light is needed, such as a cell phone, to light up the combination numbers. These locks can also be difficult to unlock when they are locked up in a crowded bike rack. You can find your bike lock angled in ways that make it difficult to input your combo. The key locks also cause problems. They are inconvenient because the owner must always carry around that key, and for people who don't have other keys this can be a inconvenient. These keys are also easily lost and are not smooth and efficient during operation. Both of these locks simply waste too much time.

SUMMARY OF THE INVENTION

An object of the is to save the owner time by providing a lock that is not only convenient but much more efficient than the current locks on the market.

According to one aspect, the invention provides a bicycle padlock comprising:

a central body containing a locking mechanism;

a first U-shape latching shackle and a second U-shape latching shackle, the shackles extending in respective opposite directions from respective anchoring openings in respective opposite sides of the body for movement, independently of each other, between a retracted, locked position in which both arms of each shackle are contained inside the body to an extended, unlocked position in which shackle arms are freed for independent swivelling movement away from the body out of alignment with a respective opening;

wherein the locking mechanism comprises electromechanical means for unlocking the shackles automatically, without manipulation in response to an external signal.

The provision of two individually/independently locking shackles extending spaced apart, back-to-back, from opposite sides of the body provides a desirable separation from each other, obviating much of the handling difficulties associated with encircling and trapping several bicycle parts with a single, shackle. Additionally, the padlock can be unlocked remotely, without requiring manipulation of either a key or tumblers enabling unlocking to be easily and automatically achieved in darkness in a typically confined crowded and inaccessible bicycle parking area and without need for body access to the padlock but only, at most, access by an extended hand etc. Preferably, the shackles are of unequal size so that the larger shackle can be employed to trap the bicycle wheel to the frame, while the smaller shackle encircles a post, as typically required, enabling the padlock to be desirably compact.

Desirably, the shackles extend away from the body in the opposite directions for unequal distances with a shackle of larger size extending further than a shackle of smaller size.

It is also preferred that the padlock includes a secondary, manually operated unlocking mechanism for use when the automatic/electronic means is inoperable.

More specifically, the locking mechanism comprises an electrical circuit including electric motor means; shackle latching members operable by the motor; a mount for a battery supplying power to the circuit, electronic reader/receiver for receiving an unlocking signal, and a microprocessor operatively connected between the motor and the reader to operate the motor to disengage the shackle latching members in response to a signal received from the reader/receiver Additionally, especially for battery conservation the circuit includes a motion switch connected to the microprocessor which is programmed to operate the motor only within a predetermined time of receiving a motion detecting signal from the motion switch.

The reader/receiver many comprise one of an RFID reader, magnetic strip reader, barcode reader, glyph reader, infra red (IR) reader, radio frequency (RF) reader, near field communication device (NFC) and fingerprint reader. In a particular embodiment, an arm of each shackle has a latching cavity adjacent a free end thereof and the locking mechanism includes a pair of latching cavity engaging pins carried, spaced apart from each other, by respective opposite ends of a transverse pin block which is provided on a forward side with a central, forwardly opening, anti-rotation seat; an axial drive screw having a rear end, rear of the seat, operably connected to the motor and a forward end extending forwardly freely through the pin block and seat; a pin block pulling nut threadingly engaged with the forward end of the axial drive screw and received in the anti-rotation seat remote from the motor, so that rotation of the drive screw by the motor retracts the nut thereby pulling back the pin block to withdraw the pins out from latching engagement with the latching cavity to unlock the padlock.

The secondary manually operated padlock unlocking mechanism may include an aperture in a sidewall of the housing body aligned with the keyway and a removable plug in the aperture so that removal of the plug provides access to the keyway for a key to rotate the screw so that the nut pulls the pin block rearwardly withdrawing the pins out of the latching recesses to release the shackle arms.

The RFID technology will be activated through a sticker that can be placed on any item. One common item that almost every person carriers on them at any given time is some form of identification. For a college student it is their student ID card, and for other citizens it is their drivers license (or some other form of identification). The consumer can place the sticker on their ID card and unlock their bike by simply swiping the card across the lock.

BRIEF DESCRIPTION OF THE DRAWINGS

In order that the invention may be readily understood, embodiments thereof will now be described with reference to the accompanying drawings in which.

DETAILED DESCRIPTION OF A PREFERRED EMBODIMENT

Figure 1:
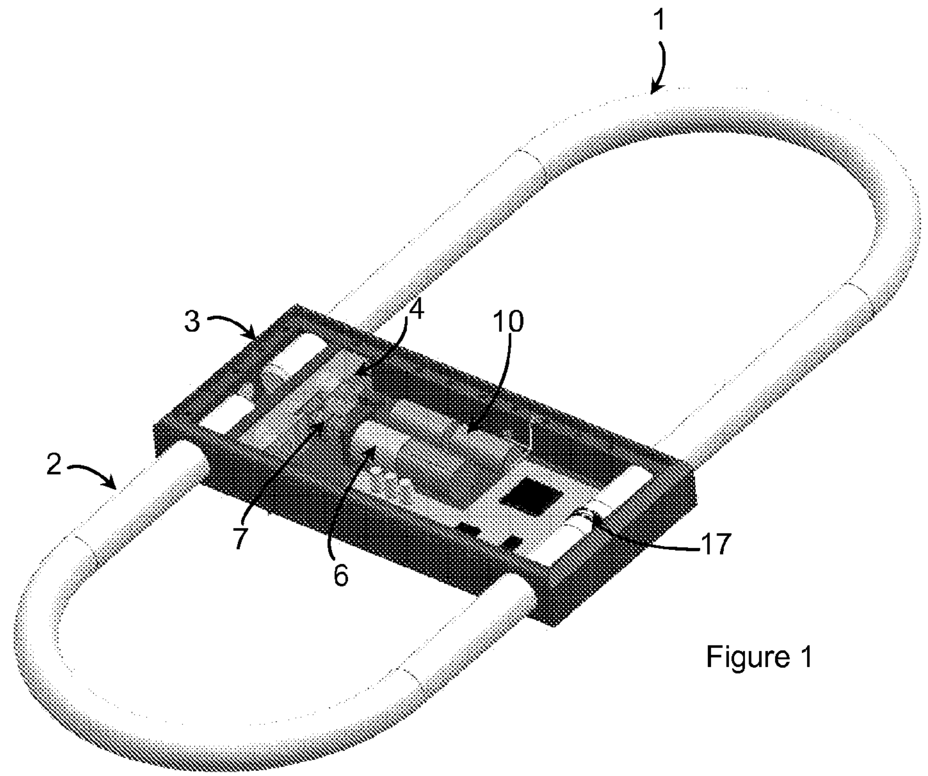
FIG. 1 is a perspective view of a first embodiment of bicycle padlock according to the invention in a locked state with a cover of the housing body removed.
Figure 2:
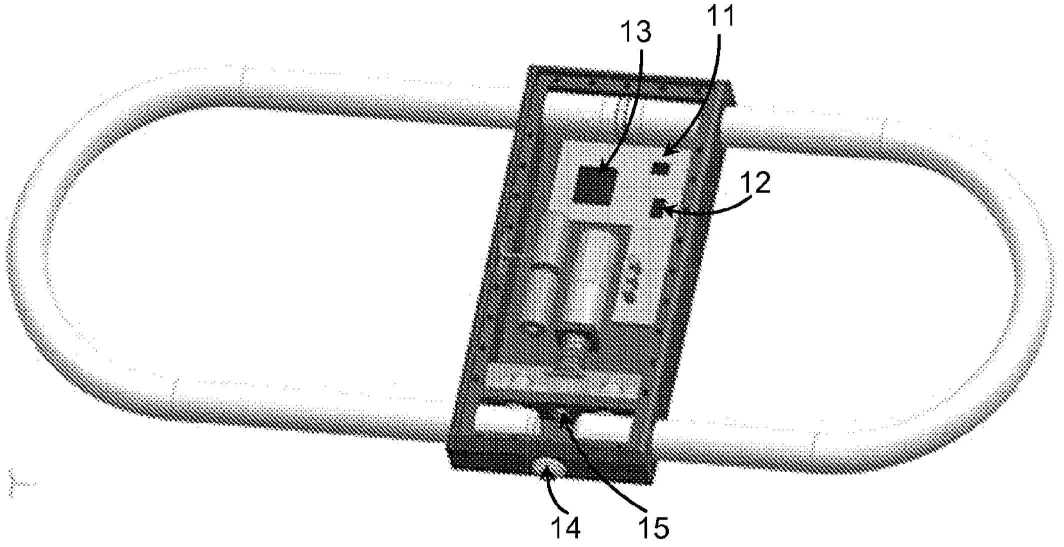
FIG. 2 is a perspective view of the first embodiment from a different aspect.
Figure 3:
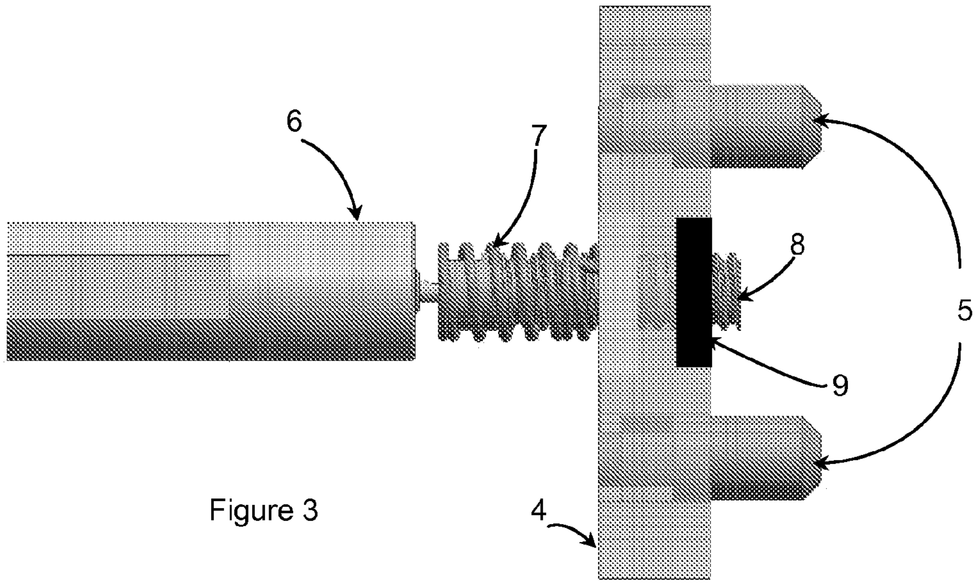
FIG. 3 is a view of latching elements carried by the motor.

Referring to FIGS. 1 through 3, a bicycle padlock comprises two, U-bar, metal shackles 1 and 2 extending in coplanar relation from openings in respective opposite sides of a central housing body or case 3. One, longer arm of each shackle has a collar mounted at a free end trapping the arm inside the housing during shackle extension, when unlocked. The other, shorter, arm of each shackle has a chamfered free end and, adjacent such end, has a latching cavity receiving a respective latching pin/dog 5, in the locked position, shown in FIG. 3. The pins are anchored in a pin block or cross bar 4 normally urged towards the shackles by a coil spring 7 mounted coaxially on a linear drive screw 8 between the pin block and a radial retaining projection on the drive screw. The drive screw 8 is turned by an electrical motor 6 and rides on a threaded engagement nut 9 seated against rotation in, but not directly attached to, (free for forward movement relative to), the pin block, so as to travel on the linear screw drive 8, when driven by motor 6, between advanced and withdrawn positions corresponding to locked and unlocked states.

Specifically, in operation, rotation of the linear screw by motor activation withdraws the threaded engagement nut 9, compressing the spring 7 and withdrawing pin block 4 from the engaged shackle arms, unlocking the lock. After an appropriate dwell period, motor 6 reverses direction, advancing the nut 9 towards the shackle arms permitting axial expansion of the spring to exert a forward force on the pin block, forcing the pins 5 into locking engagement with the registering latching notches in the shackle arms when the shackles are fully withdrawn. When the shackles are not fully withdrawn so that the latching notches are not in registering alignment with the pins, the forward biasing action of spring 7 on the pins is overcome when the shackles are pushed into the case to close the lock, as the pins are pushed/cammed back against the spring by the chamfered ends of the shackle arms, rearward movement of the pin block being permitted as the nut is not attached thereto.

Figure 4:
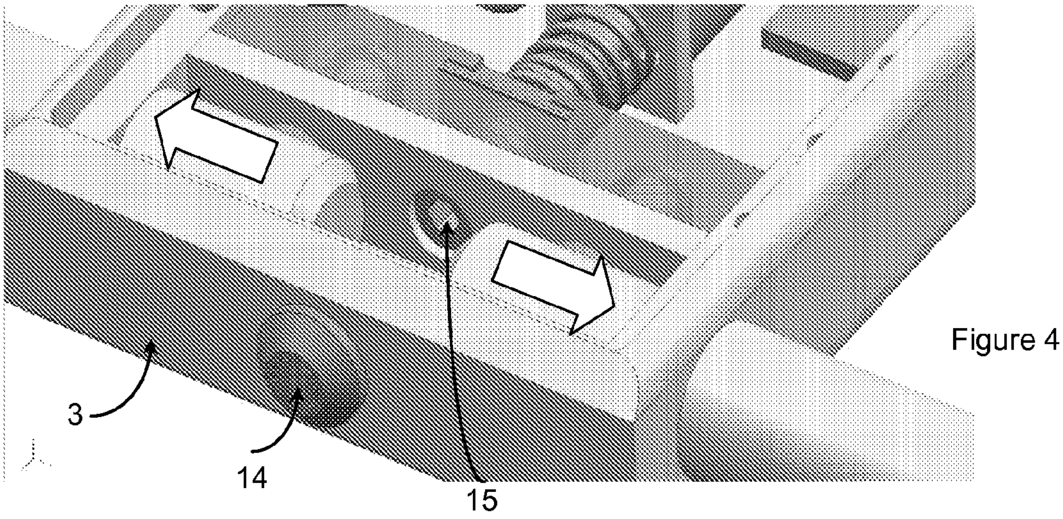
FIG. 4 is an enlarged, fragmentary view of the first embodiment showing the locking mechanism in greater detail.
Figure 5:
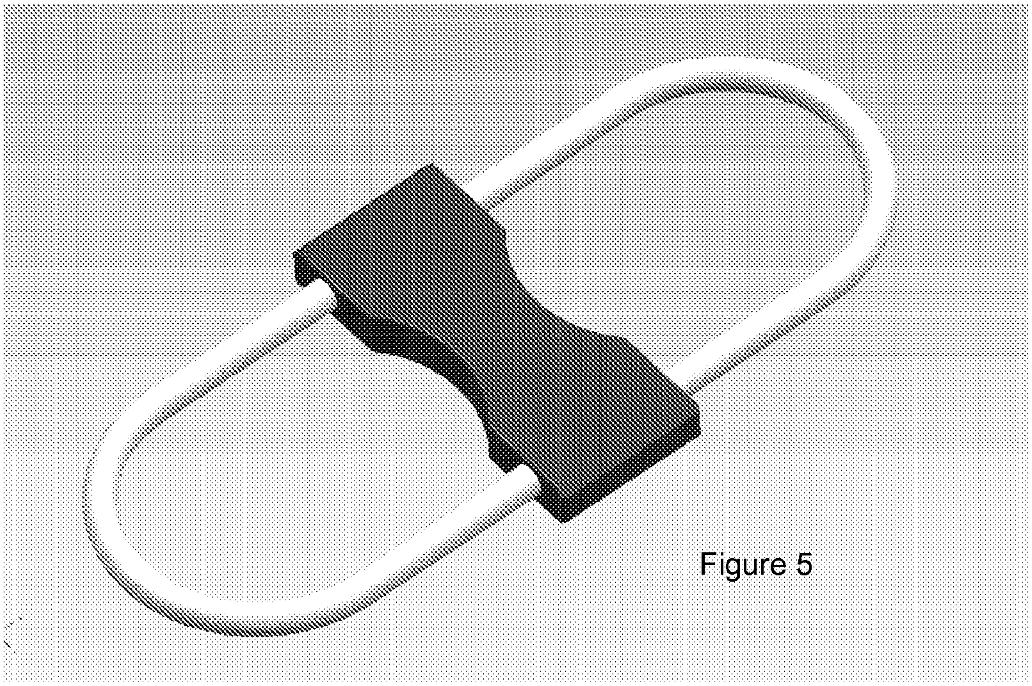
FIG. 5 is a perspective view of a second embodiment of a locked padlock according to the invention.
Figure 6:
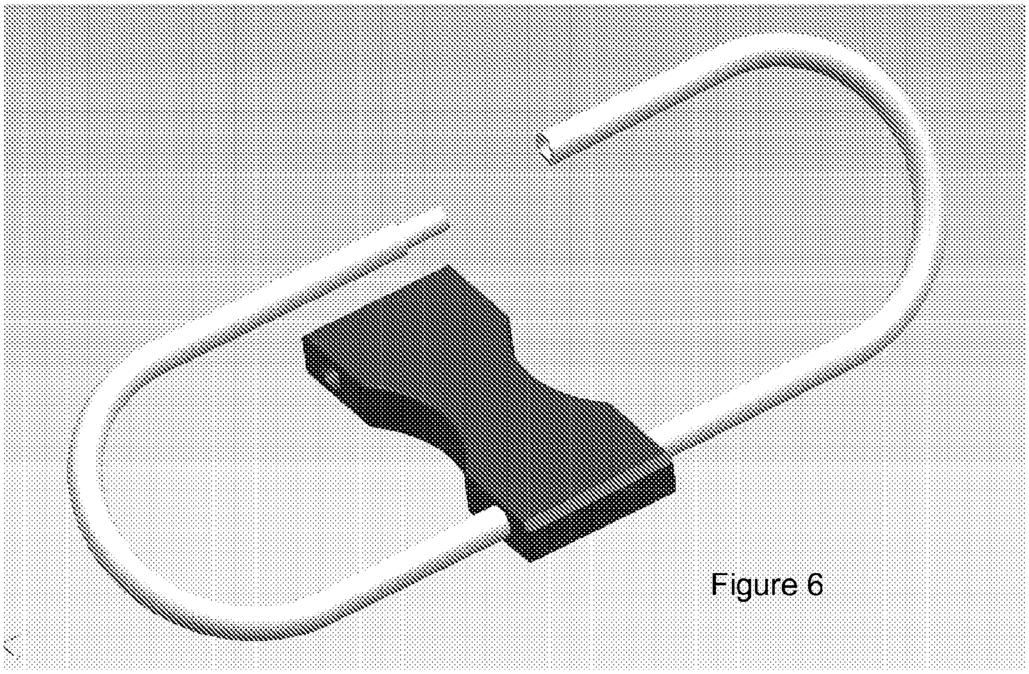
FIG. 6 is a perspective view of the second embodiment in an unlocked state with each shackle extended with one arm swiveled away from the body.
Figures 7, 7A, 7B, 7C, 7D:
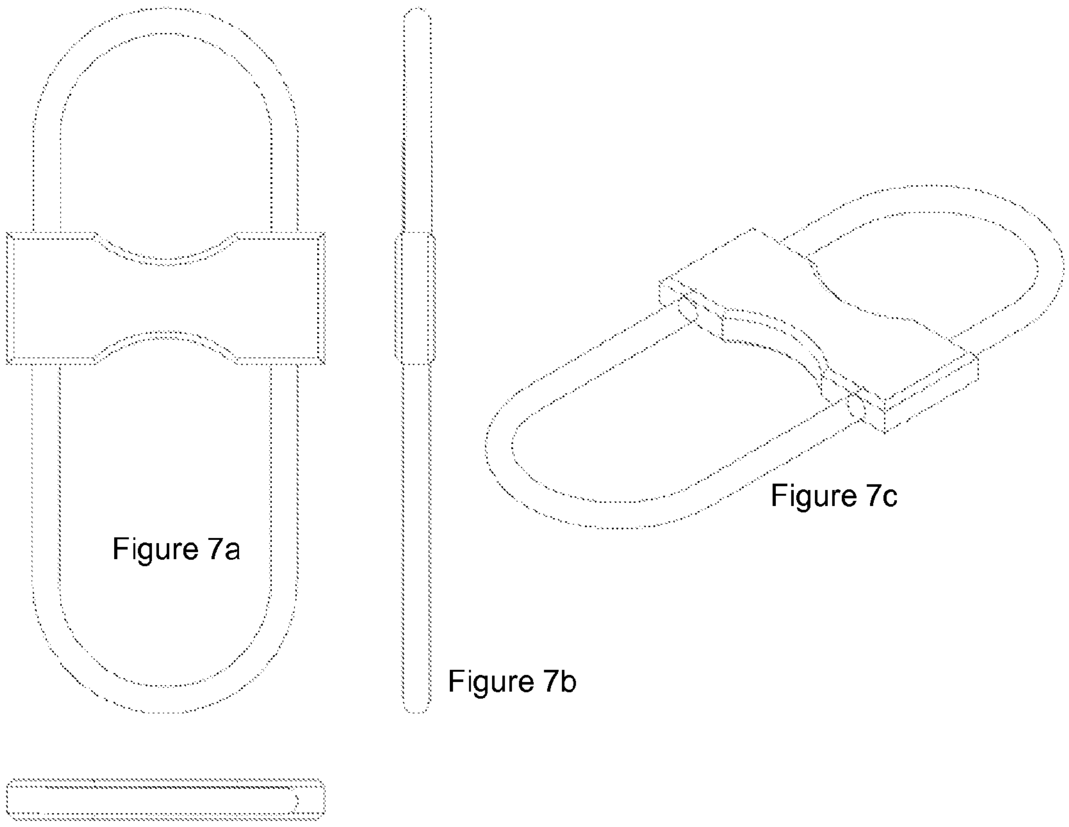
FIG. 7*a*-7*d* are plan, side, perspective and end views of the second embodiment.
Figure 8:
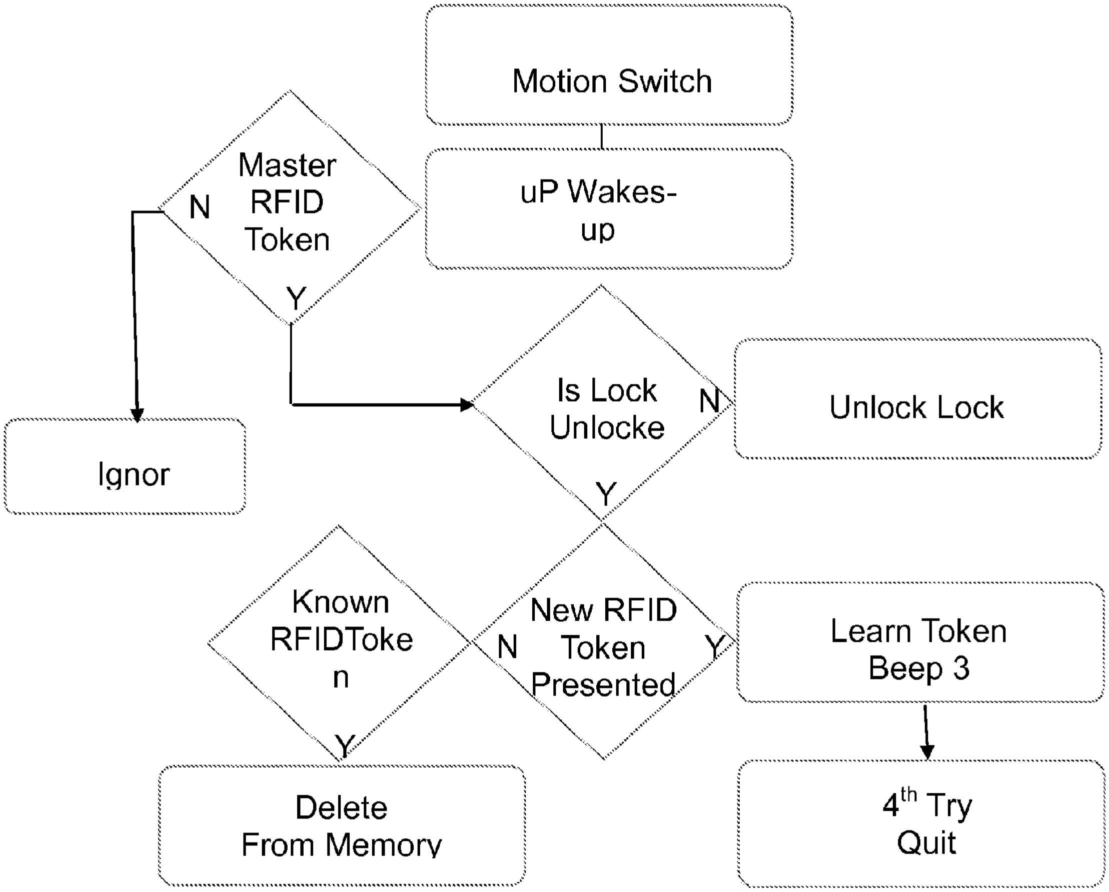
FIG. 8 is a flow chart of the programming steps.
Figure 9:
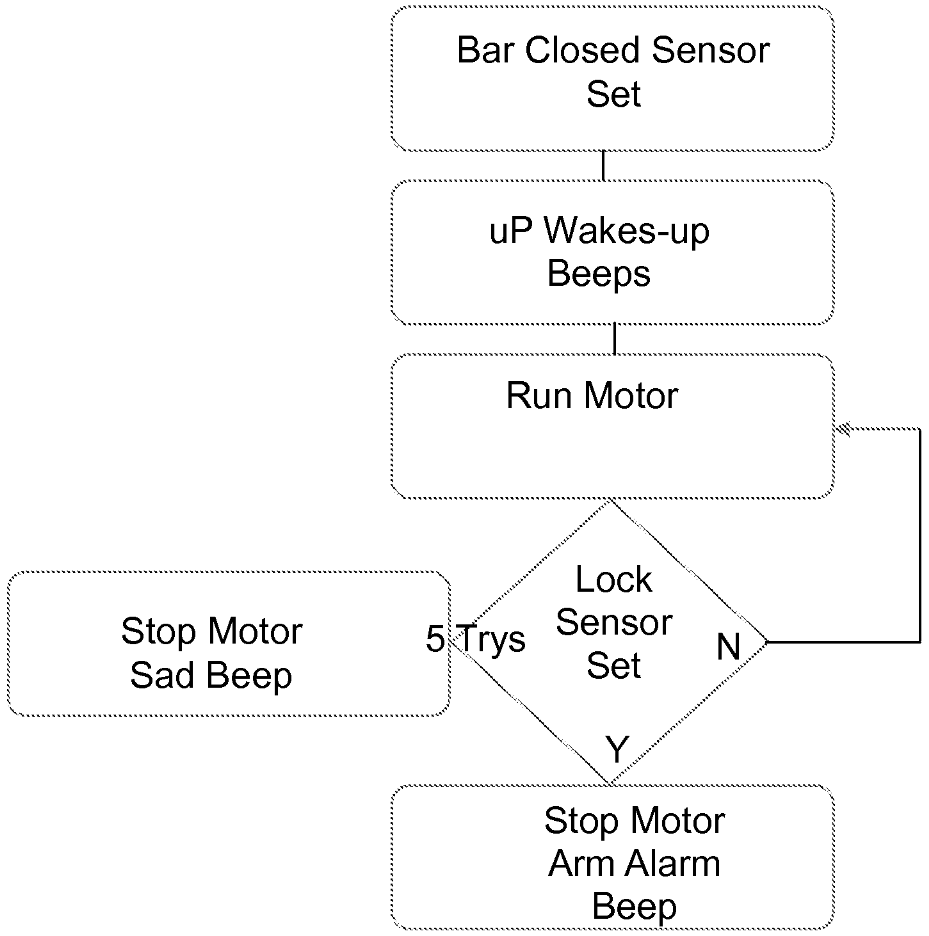
FIG. 9 is a flow chart of the locking steps.
Figure 10:
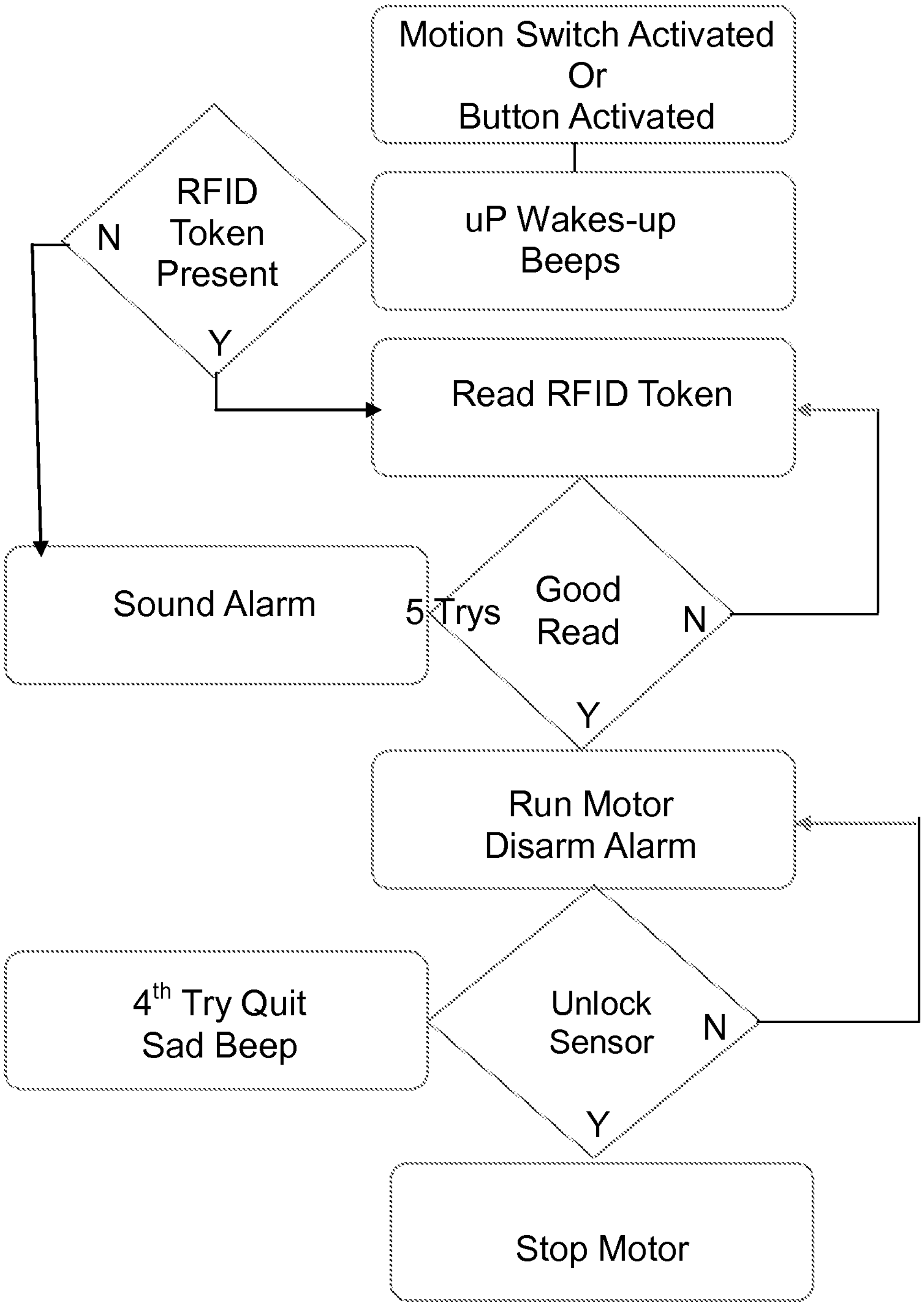
FIG. 10 is a flow chart of the unlocking steps.

The motor 6 is activated by an RFID token or NFC signal received by an RFID receiver 13. In order to conserve power, the receiver 13 is only powered on when it is activated by microprocessor 11, which, in the first embodiment, is programmed to activate the RFID receiver only when the lock case is moved sufficiently to trigger motion sensor switch 12. The electronic circuitry is powered by batteries 10. In the event of battery failure or electro-mechanical fault the padlock can be manually disengaged by a manual, mechanical override by-pass, shown in FIG. 4. Removing a by-pass lock plug 14 reveals an opening providing access to a mechanical by-pass socket 15 in the leading end of the drive screw 8. Inserting a custom socket tool and rotating the linear screw drive manually withdraws the threaded engagement nut and thereby the pin block and pins from the arm latching notches, unlocking the lock.

In the second embodiment, shown in FIG. 5 to 7*d*, the padlock body is waisted instead of the rectanguloid shape of the first embodiment.

The invention claimed is:

1. A bicycle padlock comprising:

a central body containing a locking mechanism;

a first U-shape latching shackle and a second U-shape latching shackle, the shackles being of unequal size and extending in respective opposite directions from respective anchoring openings in respective opposite sides of the body for unequal distances with a shackle of larger size extending further than a shackle of smaller size and for movement, independently of each other, between a retracted, locked position in which both arms of each shackle are contained inside the body to an extended, unlocked position in which shackle arms are freed for independent swivelling movement away from the body out of alignment with a respective opening;

wherein the locking mechanism comprises electro-mechanical means for unlocking the shackles automatically, without manipulation in response to an external signal comprising an electrical circuit including electric motor means; shackle latching members operable by the motor; a mount for a battery supplying power to the circuit, an electronic reader/receiver for receiving an unlocking signal, and a microprocessor operatively connected between the motor and the reader to operate the motor to disengage the shackle latching members in response to a signal received from the reader/receiver; a motion switch connected to the microprocessor which is programmed to operate the motor only within a predetermined time of receiving a motion detecting signal from the motion switch;

wherein an arm of each shackle has a latching cavity adjacent a free end thereof and the locking mechanism includes a pair of latching cavity engaging pins carried, spaced apart from each other, by respective opposite ends of a transverse pin block which is provided on a forward side with a central, forwardly opening, anti-rotation seat; an axial drive screw having a rear end, rear of the seat, operably connected to the motor and a forward end extending forwardly freely through the pin block and seat; a pin block pulling nut threadingly engaged with the forward end of the axial drive screw and received in the anti-rotation seat remote from the motor, so that rotation of the drive screw by the motor retracts the nut thereby pulling back the pin block to withdraw the pins out from latching engagement with the latching cavity to unlock the padlock, and wherein the padlock further comprises a secondary, manually operated unlocking mechanism for use when the automatic/electronic means is inoperable.

2. A padlock according to claim 1, wherein the reader/receiver comprises one of an RFID reader, magnetic strip reader, barcode reader, glyph reader, infra red (IR) reader, radio frequency (RF) reader, near field communication device (NFC) and fingerprint reader.

3. A padlock according to claim 1, wherein the secondary manually operated padlock unlocking mechanism includes an aperture in a sidewall of the housing body aligned with the keyway and a removable plug in the aperture so that removal of the plug provides access to the keyway for a key to rotate the screw so that the nut pulls the pin block rearwardly withdrawing the pins out of the latching recesses to release the shackle arms.

4. A bicycle padlock comprising:

a central body containing a locking mechanism;

a first U-shape latching shackle and a second U-shape latching shackle, the shackles extending in respective opposite directions from respective anchoring openings in respective opposite sides of the body for movement, independently of each other, between a retracted, locked position in which both arms of each shackle are contained inside the body to an extended, unlocked position in which shackle arms are freed for independent swivelling movement away from the body out of alignment with a respective opening;

wherein the locking mechanism comprises electro-mechanical means for unlocking the shackles automatically, without manipulation in response to an external signal comprising an electrical circuit including electric motor means; shackle latching members operable by the motor; a mount for a battery supplying power to the circuit, an electronic reader/receiver for receiving an unlocking signal, and a microprocessor operatively connected between the motor and the reader to operate the motor to disengage the shackle latching members in response to a signal received from the reader/receiver;

wherein an arm of each shackle has a latching cavity adjacent a free end thereof and the locking mechanism includes a pair of latching cavity engaging pins carried, spaced apart from each other, by respective opposite ends of a transverse pin block which is provided on a forward side with a central, forwardly opening, anti-rotation seat; an axial drive screw having a rear end, rear of the seat, operably connected to the motor and a forward end extending forwardly freely through the pin block and seat; a pin block pulling nut threadingly engaged with the forward end of the axial drive screw and received in the anti-rotation seat remote from the motor, so that rotation of the drive screw by the motor retracts the nut thereby pulling back the pin block to withdraw the pins out from latching engagement with the latching cavity to unlock the padlock.

5. A padlock according to claim 4, further including a motion switch connected to the microprocessor which is programmed to operate the motor only within a predetermined time of receiving a motion detecting signal from the motion switch.

6. A padlock according to claim 4, wherein the shackles are of unequal size.

7. A padlock according to claim 6, wherein the shackles extend away from the body in the opposite directions for unequal distances with a shackle of larger size extending further than a shackle of smaller size.

8. A padlock according to claim 7, including a secondary manually operated unlocking mechanism for use when the automatic/electronic means is inoperable, wherein the padlock further comprises a secondary, manually operated, unlocking mechanism for use when the automatic/electronic means is inoperable.

9. A padlock according to claim 8, wherein the secondary manually operated padlock unlocking mechanism includes an aperture in a sidewall of the housing body aligned with the keyway and a removable plug in the aperture so that removal of the plug provides access to the keyway for a key to rotate the screw so that the nut pulls the pin block rearwardly withdrawing the pins out of the latching recesses to release the shackle arms.

* * * * *